July 9, 1935.  A. Y. DODGE  2,007,270
LUBRICATING DEVICE
Filed April 20, 1932  2 Sheets-Sheet 1
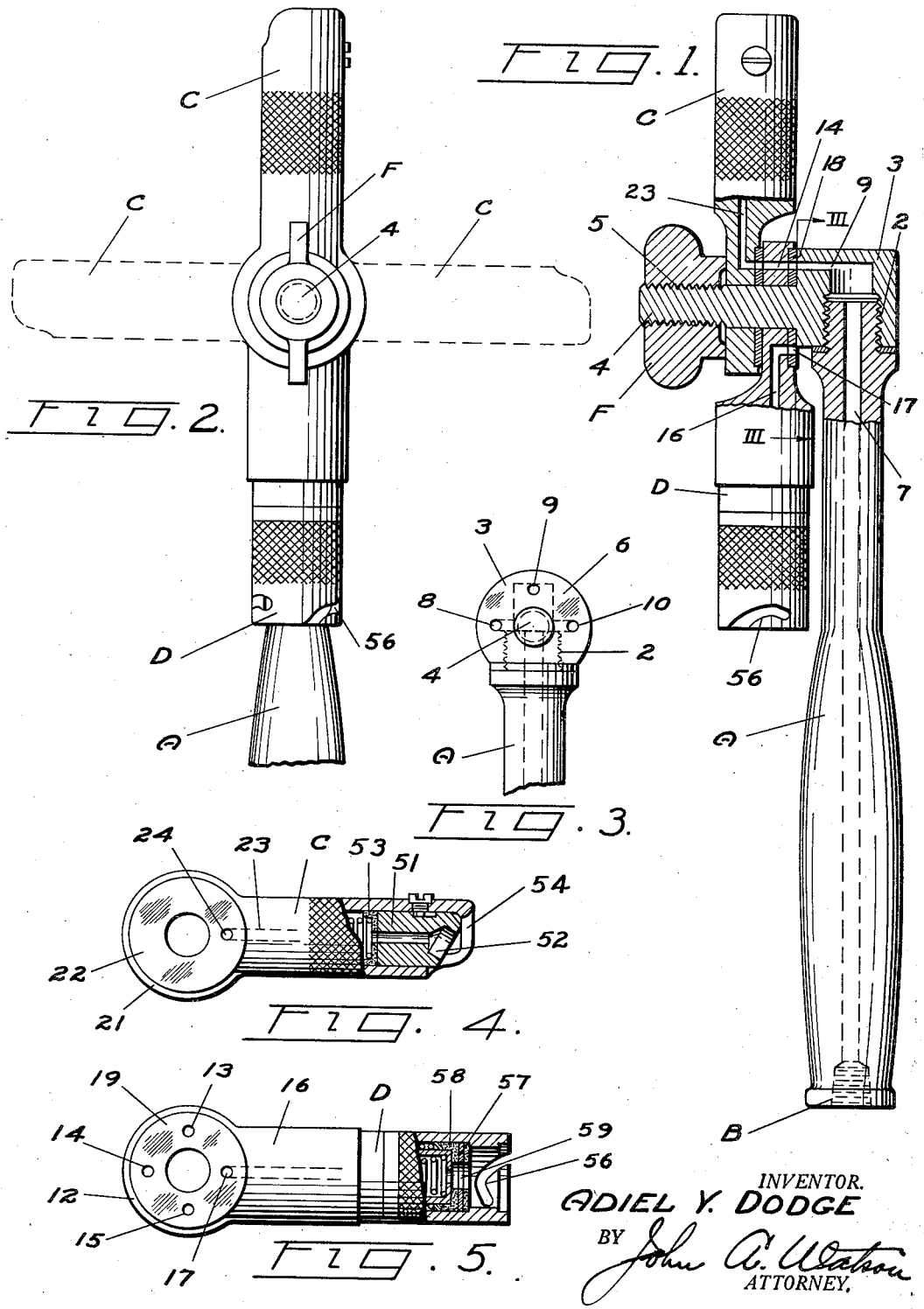

July 9, 1935.  A. Y. DODGE  2,007,270
LUBRICATING DEVICE
Filed April 20, 1932  2 Sheets-Sheet 2
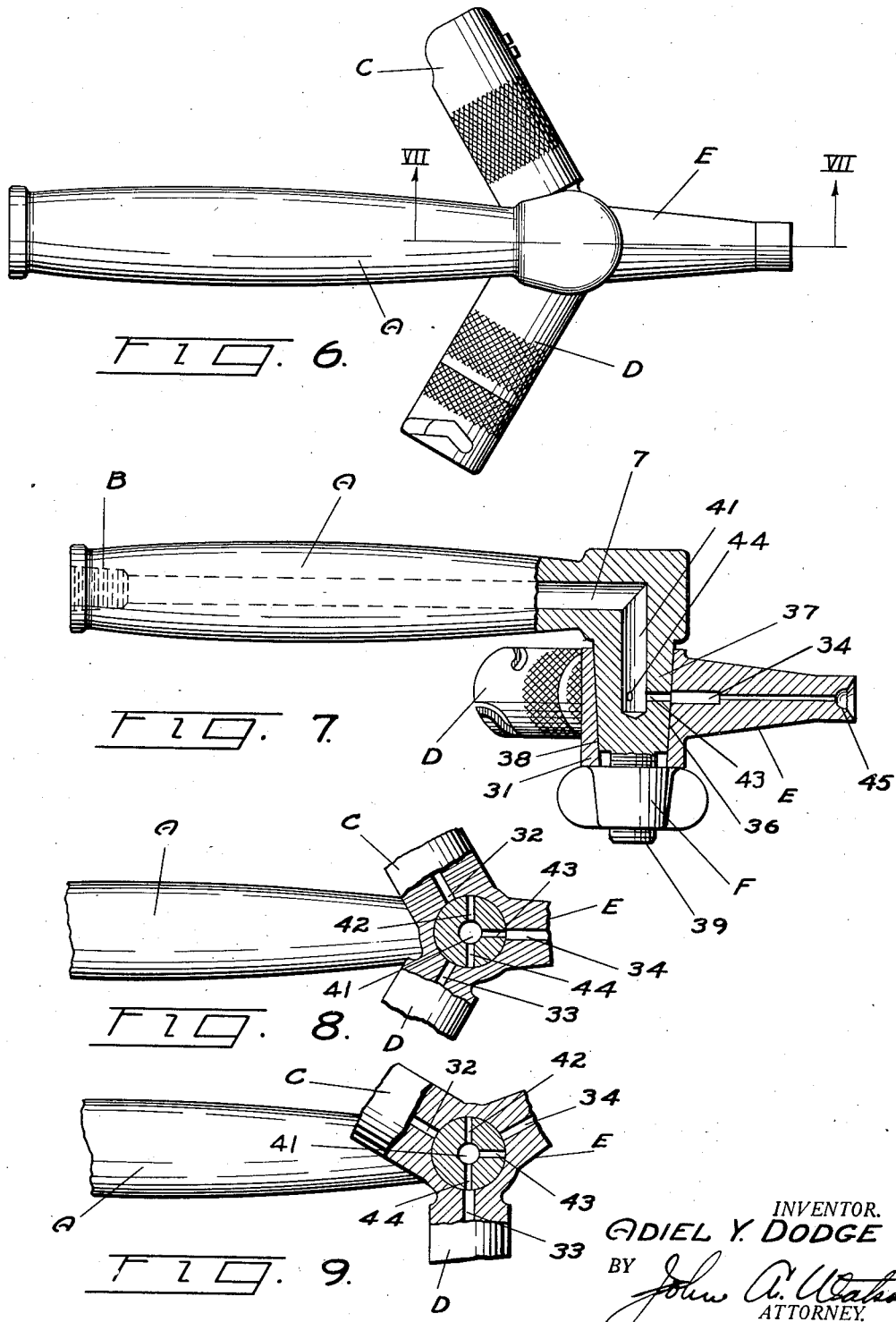

Patented July 9, 1935

2,007,270

UNITED STATES PATENT OFFICE 2,007,270

LUBRICATING DEVICE

Adiel Y. Dodge, South Bend, Ind., assignor to The Lubrication Corporation, South Bend, Ind., a corporation of Delaware Application April 20, 1932, Serial No. 606,398

3 Claims. (Cl. 284—18)

This invention relates to lubricant devices and more particularly to lubricant discharge nozzles for servicing lubricant receiving nipples or fittings of various species.

An object of the invention is to provide a device incorporating a plurality of discharge nozzles selectively connectable with a source of lubricant supply.

Another object is to provide a device as described wherein only one of the nozzles may be connected with the source of supply at a time.

A further object is to provide a lubricant discharge device wherein the angular position of the selected nozzle with respect to the manually engageable support therefor may be varied as desired.

Another object is to provide in a device as described means for locking all of the nozzles simultaneously in their adjusted positions.

A still further object is to provide a lubricant discharge device which is simple in construction, easy to operate and which may be manufactured at relatively low cost.

Other objects, the advantages and uses of the invention, will be or should become apparent after reading the following description and claims and after consideration of the accompanying drawings forming a part of this specification, in which:

Fig. 1 is a side elevation partly in section of a two nozzle lubricant discharge device constructed in accordance with my invention;

Fig. 2 is a front elevation of the device illustrated in Fig. 1;

Fig. 3 is a view along the line III—III of Fig. 1;

Fig. 4 is a side elevation of one of the nozzles of the device of Fig. 1;

Fig. 5 is a view similar to Fig. 4 of the remaining nozzle of the device;

Fig. 6 is a plan view of another form of my improved discharge device;

Fig. 7 is a sectional view along the line VII—VII of Fig. 6;

Fig. 8 is a fragmentary view partly in section illustrating the function of the selective nozzle feed ducts with the operatively positioned nozzle along the axis of the feed conduit; and Fig. 9 is a view similar to Fig. 8 but showing the operatively positioned nozzle at right angles to the axis of the conduit.

In general the multiple nozzle lubricant discharge devices selected to illustrate my invention comprise a tubular handle A forming a conduit adapted for connection at B with a source of lubricant supply, a plurality of discharge nozzles C, D or C, D, and E mounted upon the handle A and free to swivel thereupon about an axis perpendicular to the axis of the handle, means including a series of lubricant passages and ports for selectively connecting the nozzles with the bore of the handle A and a wing nut F operable to secure the nozzles in their selected position.

In Figs. 1 to 5 I have illustrated one form of the device in which the tubular handle A is externally threaded at its upper end at 2 and has secured thereto by threaded engagement a body member 3. The body 3 is provided with a laterally extending integral shaft 4 upon which the nozzles C and D are rotatably mounted to provide a swivel connection. The wing nut F is disposed upon the outer and externally threaded portion 5 of the shaft 4 whereby the nozzles may be clamped between the wing nut F and the adjacent face 6 of the body 3. The body 3 is hollow and the interior communicates with the bore 7 of the tubular handle or conduit A and is further formed with three laterally extending passages defining ports 8, 9 and 10 through the face 6 of the body and arranged about the shaft 4 at 90° from one another. The hub 12 of the nozzle D is provided with three passages 13, 14 and 15 extending laterally therethrough and arranged to register respectively with the ports 8, 9 and 10 of the body 3 when disposed in that position shown in Fig. 1. A fourth passage 16 is provided within the nozzle having its mouth 17 at the inner side of the hub 12 and 90° from the adjacent passages 13 and 15. The passage 16 serves to conduct lubricant to the discharge orifice of the nozzle D. A packing washer 19 having openings forming continuations of the passages 13, 14 and 15 and port 17 is disposed against the inner face of the hub 12 of the nozzle D within a recess 18 of the hub so that a lubricant tight seal may be maintained between the lubricant conducting port 9 and the passage of the nozzle with which it is associated at the time.

The nozzle C has a hub 21 similar to the hub 12 of the nozzle D and a packing washer 22 corresponding to the washer 19. It has but one passage however, that being a passage 23 communicating with the discharge orifice of the nozzle and terminating in a port 24 extending laterally through the inner face of the hub and the washer 22 so that it may register with either of the ports 8, 9 or 10 of the body 3 through one of the passages 13, 14 and 15 of the nozzle D. In Fig. 1 the port is shown in registration of the port 9 of the body 3 through the passage 14, the remaining aligned ports 8 and 10 and the passages 13 and 15 being closed by the adjacent face of the washer 22. I have shown in Fig. 2 in dotted lines the two remaining operative positions of the nozzle C. When the nozzle is swung to the left position, as viewed in Fig. 2, lubricant will be conducted from the body 3 through the port 8, the passage 13 and the nozzle D into the passage 23 to the discharge orifice of the nozzle. When moved to the right the travel of lubricant in the device will be by way of port 10, the passage 15 and the passage 23. The wing nut F may be employed to securely clamp each nozzle in any of the three positions desired during use and readjustment of the nozzles quickly obtained by a slight releasing turn of the wing nut.

The nozzle E illustrated at C may be of that type of nozzle disclosed in the United States patent to Herlihy Re. 18,288 and designed for servicing lubricant receiving fittings having spherical heads over which the nozzle may be moved, during the servicing operation, within a predetermined angular range. The nozzle illustrated in D may be that type of nozzle employed for servicing lubricant receiving fittings known in the art as pin fittings and illustrated in the United States patent to Arthur V. Gullborg No. 1,316,714. I have therefore provided a lubricant discharge device which may be employed at will to service a plurality of distinctly different types of lubricant receiving fittings incorporating nozzles peculiar to the fittings and which nozzles may be positioned at will along axes parallel or transverse to the axis of the lubricant conduit and handle through which lubricant is conducted thereto. This latter function is of importance as the angle of approach to a lubricant receiving fitting, particularly upon inaccessible parts of the machinery and automobile bearings, is often tortuous and difficult to follow directly along the axis of the lubricant conducting conduit.

In Figs. 6 to 9 I have illustrated another form of the lubricant discharge device in which a third type of nozzle E is incorporated in addition to the nozzles C and D. The three nozzles C, D and E are rigidly mounted with parts integrally formed with and upon a central hub 31 and disposed 120° apart about the axis thereof. Each of the nozzles C, D and E has a lubricant conducting passage 32, 33 and 34 respectively disposed in a common plane and communicating with the tapered inner bore 36 of the hub. The nozzle assembly C, D and E is mounted upon a laterally extending portion 37 of the handle A having a tapered side wall 38 adapted to be received within the bore 36 of the hub 31. The outer end of the projection 37 is externally threaded at 39 and the wing nut F is threaded thereupon so that by turning down upon the wing nut the nozzle assembly may be clamped tightly by wedging action upon the tubular handle projection 37 and held against rotation relative thereto as well as to establish a lubricant tight seal between the adjacent and tapered side walls. The bore 7 of the tubular handle A extends laterally through the projection 37, as shown at 41. Three passages 42, 43 and 44 extend laterally through the walls of the projection 37 to establish communication between the bore 41 and the outer and tapered wall 38 of the projection. These passages lie in a common plane and extend radially from the bore 41 at 90° apart from one another (see Figs. 8 and 9).

Inasmuch as the passages 32 to 34 of the nozzle assembly are disposed 120° apart from one another and the passages 42 to 44 inclusive are disposed 90° from one another it is therefor possible to establish communication between only one of the passages through the projection 37 and one of the passages associated with the nozzles C, D and E at one time, the remaining passages 42 to 44 inclusive being closed. This arrangement permits of the selective registration of any of the nozzles C, D or E with the lubricant conducting passage of the handle A either along the axis of the handle A, as shown at Fig. 8 or at 90° thereto, as shown at Fig. 9. The nozzle E may be that type of nozzle employed for servicing lubricant receiving fittings by metal to metal contact between an orifice defined by concave spherical walls 45 and the sharp annular rim of a conical headed fitting of the type illustrated in the United States patent to O. Zerk No. 1,475,980, Fig. 3.

In this form of the lubricant discharge device I have provided an assembly in which any one of three distinctly different types of lubricant discharge nozzles may be immediately connected with a source of lubricant supply by the mere rotation of the nozzle assembly upon the handle A and with the nozzle either aligned axially with the handle A or transversely with the handle A as desired, the adjustment being made while the wing nut F is turned slightly to the released position and the nozzle secured for service by the return of the wing nut to its clamping position.

Either of the discharge devices illustrated in Figs. 1 to 5 or Figs. 6 to 9 may be employed with a flexible lubricant conducting conduit forming a part of the conventional lubricant supply source. The attendant of a lubrication service station using a device of the character described herein has at his immediate command a nozzle for servicing any one of the various types of lubricant receiving nipples or fittings associated with the bearings or parts which are to be serviced and considerable time is thus saved which would otherwise be expended in the interchange of the entire nozzle unit of the lubricant servicing apparatus.

In Figs. 4 and 5 I have illustrated the nozzles C and D respectively partially in section so that the fitting engaging portions of the nozzles may be seen. The nozzle C includes a member 51 within which the discharge orifice 52 of the nozzle is formed slidably disposed within the barrel of the nozzle. Packing in the form of a cup washer 53 is disposed at the inner end of the member 51 so that lubricant under pressure within the barrel may urge the member 51 outwardly to clamp the spherical head of the ball fitting between the walls of the discharge orifice 52 and the adjacent surfaces of an integrally formed clamping element 54 on the barrel C. The nozzle D is formed with a bayonet slot 56 in the barrel of the nozzle within which the pin of a pin fitting is engaged. A series of soft leather washers 57 are disposed within the barrel and subjected to lubricant pressure as well as the pressure exerted by the compression spring 58 so that a lubricant tight seal is effected between the top face of the pin fitting and the adjacent surfaces of the washers 57. Lubricant is conducted through aligned passages 59 and the washers 57.

While I have herein illustrated and described the general character of the nozzles C, D and E it should be understood that any type of lubricant discharge nozzle peculiar to any type of lubricant receiving fitting may be substituted as desired and that the embodiments of the invention presented herein are for the purpose of illustration only, and various changes may be made without departing from the spirit of the invention and the scope of the claims.

I claim:

1. A lubricant discharge device comprising, a conduit providing a hand grip portion for the manual support of the device, a discharge nozzle pivotally mounted upon said conduit, upon an axis perpendicular to the axis of the conduit, means providing lubricant communication between said nozzle and said conduit when said nozzle is moved into predetermined positions, about its pivotal axis relative to the conduit and for shutting off communication between the nozzle and the conduit when the nozzle is moved to other positions relative to the conduit, and means operable at will for securing said nozzle and said conduit against movement with respect to one another.

2. A lubricant discharge device comprising, a conduit providing a hand grip portion for the manual support of the device, a discharge nozzle pivotally mounted upon said conduit, and means providing lubricant communication between said nozzle and said conduit when said nozzle is moved into a predetermined position, about its pivotal axis, relative to the conduit, said means including a member interposed between said conduit and said nozzle and operable upon movement relative to the conduit or to the nozzle to shut off communication between the nozzle and conduit.

3. A lubricant discharge device comprising, a rigid supply conduit, a rigid extension on said conduit extending at an angle therefrom, a discharge nozzle rotatably mounted on and extending at an angle from said extension and including means to make a lubricant tight seal with a lubricant receiving fitting, means for selectively securing said nozzle in one of a plurality of selected radial positions about said extension, and means providing communication between said extension and nozzle whereby lubricant may be discharged from said nozzle in any one of a plurality of angular positions relatively to said conduit.

ADIEL Y. DODGE.

DISCLAIMER 2,007,270.—*Adiel Y. Dodge*, South Bend, Ind. LUBRICATING DEVICE. Patent dated July 9, 1935. Disclaimer filed February 24, 1936, by the assignee, *The Lubrication Corporation.*

Hereby enters this disclaimer to claim 3 of the specification.

[*Official Gazette March 17, 1936.*]